United States Patent
Reedy

(10) Patent No.: US 8,424,507 B2
(45) Date of Patent: Apr. 23, 2013

(54) RETARDING SYSTEM

(75) Inventor: John Thomas Reedy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1 day.

(21) Appl. No.: 13/223,012

(22) Filed: Aug. 31, 2011

(65) Prior Publication Data

US 2013/0047955 A1    Feb. 28, 2013

(51) Int. Cl.
- *F01L 13/06* (2006.01)
- *B60W 10/18* (2012.01)

(52) U.S. Cl.
USPC ........... 123/320; 123/323; 180/165; 180/170; 477/111

(58) Field of Classification Search .................. 123/320, 123/323; 180/165, 170; 477/111
See application file for complete search history.

(56) References Cited

U.S. PATENT DOCUMENTS

| | | | |
|---|---|---|---|
| 5,359,969 A | 11/1994 | Dickrell et al. | |
| 5,679,093 A | 10/1997 | Desautels et al. | |
| 5,816,665 A * | 10/1998 | Burnett et al. | 303/3 |
| 5,921,883 A | 7/1999 | Bellinger | |
| 6,152,853 A | 11/2000 | Banks, III | |
| 6,620,077 B2 * | 9/2003 | Carlson et al. | 477/107 |
| 7,517,300 B2 | 4/2009 | Landes | |
| 8,326,499 B2 * | 12/2012 | Sopko et al. | 701/50 |
| 2007/0192018 A1 * | 8/2007 | Gibson et al. | 701/110 |
| 2008/0054647 A1 * | 3/2008 | Kumar | 290/40 R |
| 2008/0207398 A1 | 8/2008 | Dvorak et al. | |

FOREIGN PATENT DOCUMENTS

| | | |
|---|---|---|
| EP | 1013973 | 6/2000 |
| WO | 2007046756 | 4/2007 |

* cited by examiner

*Primary Examiner* — Erick Solis
(74) *Attorney, Agent, or Firm* — Finnegan, Henderson, Farabow, Garrett & Dunner LLP

(57) ABSTRACT

A vehicle includes an engine, a transmission associated with the engine, and an engine retarder having a deactivated state and an activated state. The engine retarder is configured to provide a retarding torque to the engine in the activated state. The vehicle also includes a fan associated with the engine. The fan is configured to be activated in response to a selection of a transmission gear ratio greater than or equal to a threshold gear ratio while the engine retarder is in the activated state. The fan assists in providing additional retarding torque to the engine while activated.

20 Claims, 3 Drawing Sheets

RETARDING SYSTEM

TECHNICAL FIELD

The present disclosure relates generally to a retarding system and, more particularly, to a retarding system incorporating an exhaust brake.

BACKGROUND

Vehicles, including on and off-highway haul and vocational trucks, wheel loaders, motor graders, and other types of heavy machinery generally include a multi-speed, bidirectional transmission coupled to an engine. Such engines also typically include an engine retarder used to increase the natural resistance of the engine when braking is needed. For example, such engine retarders may include an engine brake or an exhaust brake configured to generate braking torque in braking situations. Such braking torque may supplement a braking force applied by the vehicle brakes, to assist in slowing and/or stopping the vehicle. Such braking torque may be required, for example, to slow or stop the vehicle on a relatively steep downward slope, to avoid overheating of the vehicle brakes, or in other situations where the force applied by the vehicle brakes is not sufficient to stop the vehicle as desired.

Such vehicles also include a variety of components directly or indirectly powered by the engine. For instance, one or more fans, motors, pumps, and/or other like components may be coupled to an output of the engine, and such components may be utilized to perform, for example, engine cooling, power steering, hydraulic implement actuation, and/or other like functions during operation of the vehicle. Such components may also be activated in conjunction with the engine retarder to provide additional braking torque in braking situations. This additional braking torque may assist in further reducing vehicle and/or engine speed.

One method of improving vehicle braking is described in U.S. Pat. No. 5,921,883 ("the '883 patent") issued to Bellinger on Jul. 13, 1999. The '883 patent describes a braking system including an engine brake connected to an engine of a vehicle. The engine brake is operable to provide a retarding torque based on the gear ratio, vehicle speed, and/or coasting mode of the vehicle. The '883 patent also describes an engine cooling fan configured to provide additional retarding torque. The engine cooling fan of the '883 patent is activated whenever the engine brake is activated.

Although the braking system of the '883 patent may be utilized to decrease the travel speed of a vehicle, it may be inefficient in some situations. For example, when braking the vehicle on moderate declining grades, the vehicle brakes, in combination with the engine brake, may be adequate to satisfactorily stop the vehicle without the use of an additional parasitic load on the engine. However, because the cooling fan of the braking system disclosed in the '883 patent is activated whenever the engine brake is activated, the disclosed braking system may utilize vehicle resources to operate the cooling fan even though supplemental retarding is not necessary.

The disclosed retarding system is directed to overcoming one or more of the problems set forth above.

SUMMARY OF THE INVENTION

In an exemplary embodiment of the present disclosure, a vehicle includes an engine, a transmission associated with the engine, and an engine retarder having a deactivated state and an activated state. The engine retarder is configured to provide a retarding torque to the engine in the activated state. The vehicle also includes a fan associated with the engine. The fan is configured to be activated in response to a selection of a transmission gear ratio greater than or equal to a threshold gear ratio while the engine retarder is in the activated state. The fan assists in providing additional retarding torque to the engine while activated.

In another exemplary embodiment of the present disclosure, a method of braking a vehicle includes activating an engine retarder connected to an engine of the vehicle, wherein activation of the engine provides a retarding torque to the engine. The method also includes activating a fan associated with the engine, while the engine retarder is activated, in response to a selection of a transmission gear ratio greater than or equal to a threshold gear ratio. Activation of the fan provides additional retarding torque to the engine.

In a further exemplary embodiment of the present disclosure, a method of braking a vehicle includes receiving a first signal. The first signal is indicative of a desired deceleration of the vehicle. The method further includes receiving a second signal. The second signal is indicative of an enablement of an engine retarder connected to an engine of the vehicle. The method also includes activating the engine retarder in response to receiving the first and second signals. Activation of the engine retarder provides a retarding torque to the engine. The method further includes receiving a third signal. The third signal is indicative of a selection of a gear ratio of a transmission associated with the engine. The selected gear ratio is greater than or equal to a threshold gear ratio. The method also includes activating a fan associated with the engine, while the engine retarder is activated, in response to receiving the third signal to provide additional retarding torque to the engine.

DETAILED DESCRIPTION

Figure 1:
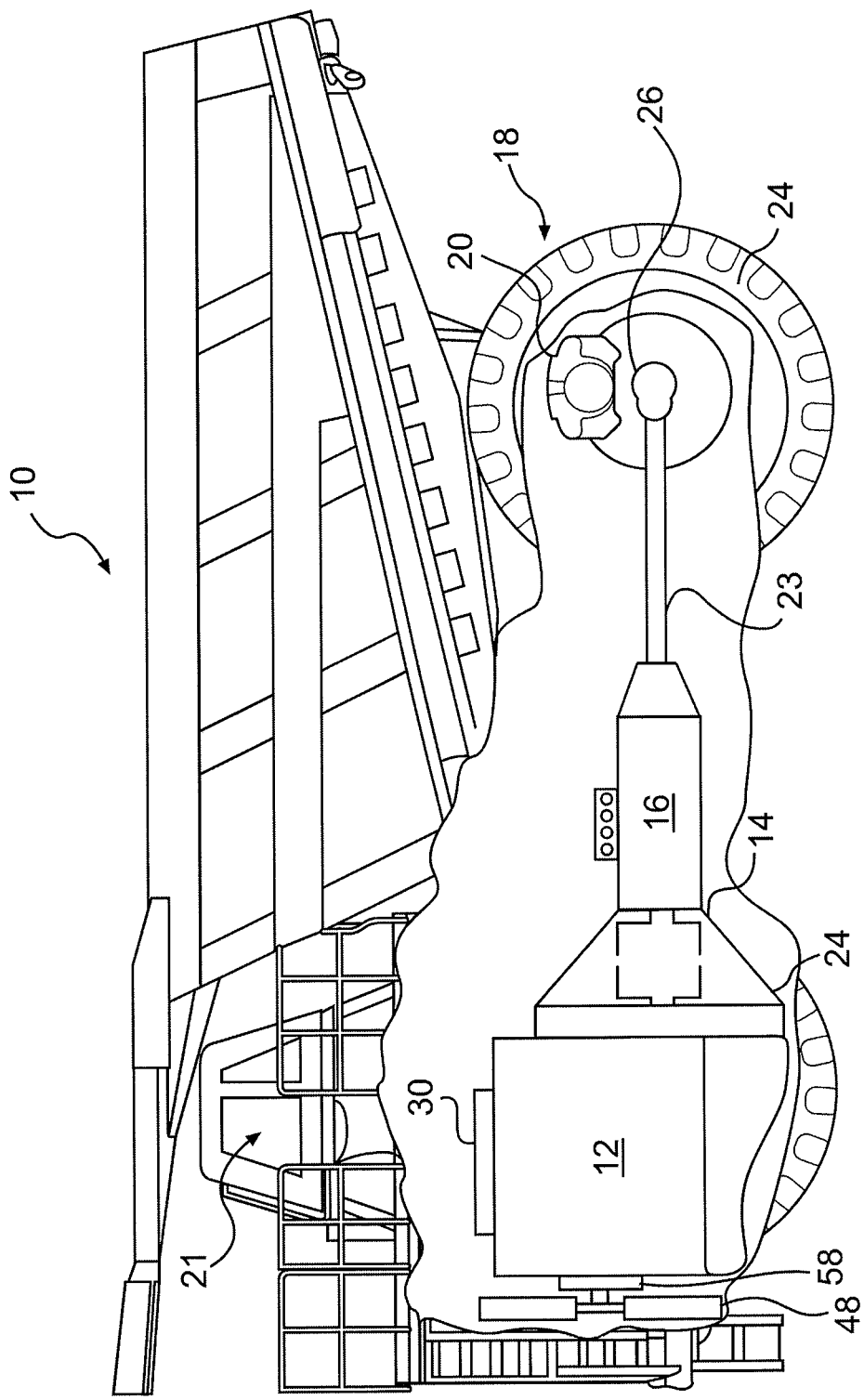
FIG. 1 is a diagrammatic illustration of an exemplary vehicle of the present disclosure.

FIG. 1 illustrates an exemplary vehicle 10. The vehicle 10 may embody a mobile machine that performs some type of operation associated with an industry such as mining, construction, farming, transportation, or any other industry known in the art. For example, the vehicle 10 may be an earth moving machine such as an off-highway haul truck, a wheel loader, a motor grader, or any other suitable earth moving machine. The vehicle 10 may alternatively embody an on-highway vocational truck, a passenger vehicle, or any other operation-performing vehicle. The vehicle 10 may include, among other things, an engine 12, a torque converter 14, a transmission 16 operably connected to a traction device 18, a brake mechanism 20, and an operator station 21.

The engine 12 may be configured to produce a power output and may include an internal combustion engine. For example, the engine 12 may include a diesel engine, a gasoline engine, a gaseous fuel-powered engine, or any other engine apparent to one skilled in the art. In additional exemplary embodiments, the engine 12 may alternatively include a non-combustion source such as, for example, a battery, a fuel cell, a motor, or any other known non-combustion source of power.

The torque converter 14 may be a hydro-mechanical device configured to couple the engine 12 to the transmission 16. In particular, the torque converter 14 may conduct pressurized fluid between an output of the engine 12 and an input of the transmission 16 to thereby drive transmission 16, while still allowing the engine 12 to rotate independently of the transmission 16. In addition, the torque converter 14 may include a lockup clutch for directly mechanically coupling the output of the engine 12 to the input of the transmission 16. In this arrangement, the torque converter 14 may selectively absorb and multiply the torque transferred between the engine 12 and the transmission 16 by either allowing or preventing slippage between the output rotation of the engine 12 and input rotation of the transmission 16. It is contemplated that the torque converter 14 may alternatively embody a non-hydraulic device such as, for example, a mechanical diaphragm clutch.

The transmission 16 may include numerous components that interact to transmit power from the engine 12 to the traction device 18. The transmission 16 may be associated with the engine 12 via the torque converter 14 or via any of a number of direct coupling devices known in the art. The transmission 16 may embody a multi-speed, bidirectional, mechanical transmission having a neutral gear ratio, a plurality of forward gear ratios, a reverse gear ratio, and one or more clutches (not shown). The transmission 16 may be selectively actuated to engage predetermined combinations of gears (not shown) that produce a desired output gear ratio. Transmission 16 may be an automatic transmission, wherein shifting is based on an engine speed, a maximum selected gear ratio, and a shift map stored within a controller 32 (FIG. 2) of the vehicle 10. The output of the transmission 16 may be connected to rotatably drive the traction device 18 via a shaft 23, thereby propelling the vehicle 10. Alternatively, the transmission 16 may be a manual transmission, wherein shifting is accomplished in response to manipulation of one or more operator interface devices (described in greater detail below) within the operator station 21.

The traction device 18 may include wheels 24 located on each side of the vehicle 10 (only one side shown). Alternately, the traction device 18 may include tracks, belts, or other driven traction components. The traction device 18 may be driven by the transmission 16 to rotate in accordance with an output rotation of the transmission 16.

The brake mechanism 20 may be configured to assist in retarding the motion of vehicle 10 and may be operably associated with each wheel 24 of vehicle 10. In one embodiment, the brake mechanism 20 may be a hydraulic pressure-actuated wheel brake such as, for example a disk brake or a drum brake disposed intermediate wheel 24 and a drive assembly 26. It is contemplated that the brake mechanism 20 may alternatively embody another non-hydraulic type of wheel brake such as an electric motor or any other similar mechanism known in the art.

Figure 2:
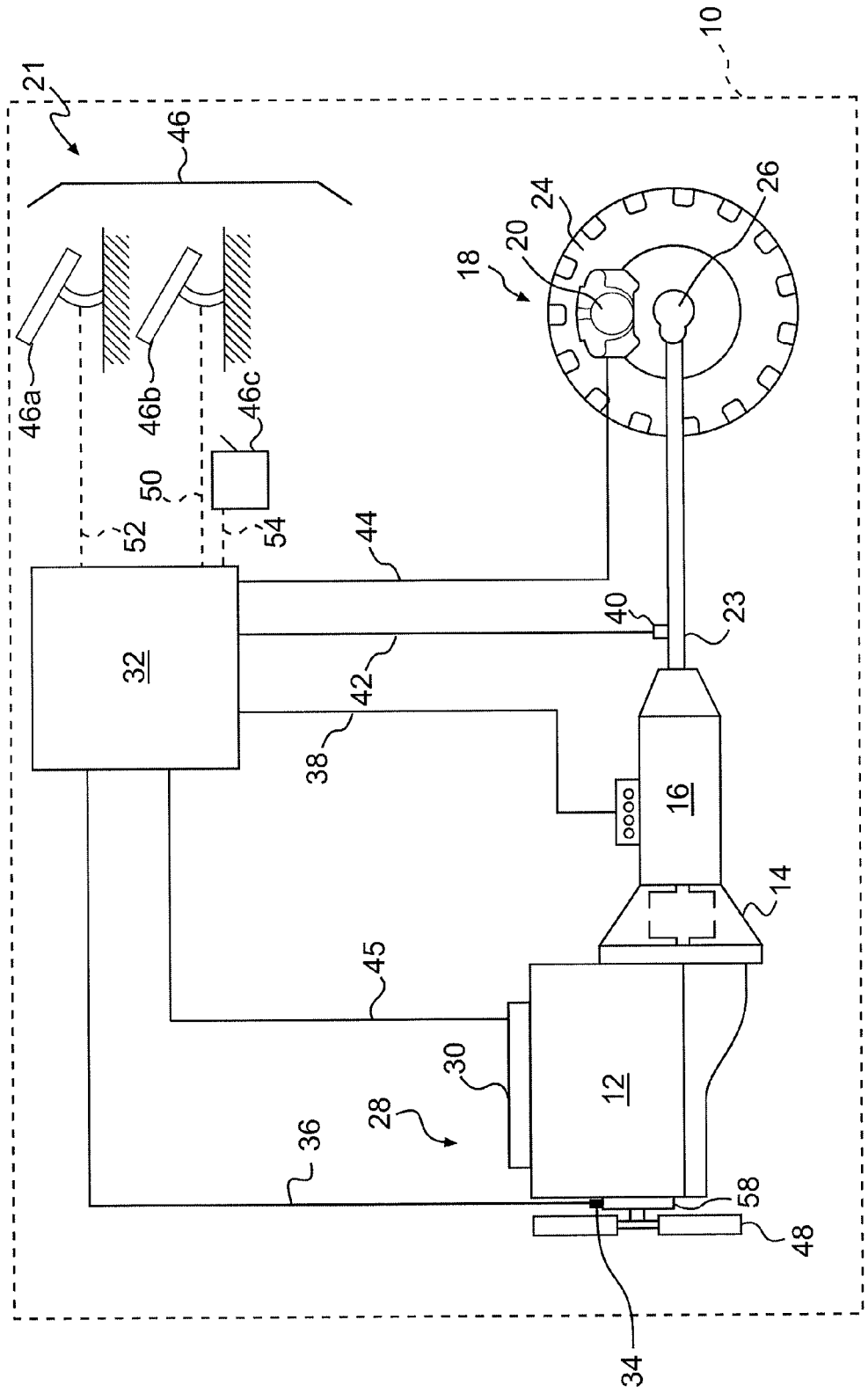
FIG. 2 is a diagrammatic illustration of an exemplary retarding system for the vehicle of FIG. 1.

The operator station 21 may be configured to receive input from a vehicle operator indicative of a desired speed, acceleration, and/or deceleration of the vehicle 10. For example, as illustrated in FIG. 2, the operator station 21 may include one or more operator interface devices 46 such as a throttle pedal 46a, a brake pedal 46b, and an engine retarder switch 46c. The throttle and brake pedals 46a, 46b may embody proportional-type controllers configured to increase or decrease the acceleration of the vehicle 10 by producing a signal that is indicative of a desired vehicle acceleration or deceleration. The engine retarder switch 46c may embody a multi-position switch and/or other like control device configured to produce a signal indicative of an enabled or a disabled setting. For example, the engine retarder switch 46c may be operably connected to an engine retarder (described in greater detail below) of the vehicle 10. The engine retarder switch 46c may have a first position in which the engine retarder is disabled, and a second position in which the engine retarder will be enabled for activation by the controller 10. The engine retarder switch 46c may include any number of additional positions as desired. It is contemplated that different operator interface devices 46 may alternatively or additionally be included within the operator station 21 such as, for example, single or multi-axis joysticks, wheels, knobs, push-pull devices, switches, levers, and/or other operator interface devices known in the art.

The throttle pedal 46a may be manually actuated to increase the rotational speed of the engine 12 and the resulting travel speed of the vehicle 10. In particular, a degree of throttle pedal actuation may represent a desired acceleration and proportionally control an amount of fuel supplied to the engine 12. It is contemplated that the throttle pedal 46a may embody a mechanical device, an electrical device, a hydraulic device, or any other type of device known in the art.

A throttle sensor (not shown) may be provided for indicating whenever throttle pedal 46a is actively indicating a desired acceleration of the vehicle 10, and the magnitude of the desired acceleration. The throttle sensor may also indicate whenever the throttle pedal 46a is actively indicating a desired deceleration of the vehicle 10 such as, for example, whenever an operator's foot has been removed from the throttle pedal 46a. In exemplary embodiments, movement of the throttle pedal 46a from a first depressed position to a second less depressed position may also be indicative of a desired deceleration of the vehicle 10. The throttle sensor may embody, for example, a switch or a pressure sensor capable of producing an electric signal indicating that acceleration or deceleration is being requested. A switch may indicate a position or angle of the throttle pedal 46a, while a pressure sensor may indicate a pressure of a pilot fluid pressurized by the motion of throttle pedal 46a.

The brake pedal 46b may be manually operated to direct pressurized fluid to the brake mechanism 20. A degree of brake pedal actuation may proportionally control a pressure and/or a flow rate of the fluid supplied to the brake mechanism 20. It is contemplated that the brake mechanism 20 may alternatively be pneumatically actuated, mechanically actuated, electrically actuated, or actuated in any other manner known in the art.

A brake sensor (not shown) may be provided for indicating whenever braking of the vehicle 10 is desired and what magnitude of braking is desired. The brake sensor may embody, for example, a switch or a pressure sensor capable of producing an electric signal indicating that deceleration is requested. A switch may indicate a position or angle of the brake pedal 46b, while a pressure sensor may indicate a pressure of a pilot fluid pressurized by the brake pedal 46b.

As illustrated in FIG. 2, the vehicle 10 may further include a retarding system 28 having components that cooperate with the brake mechanism 20 and/or the transmission 16 to decelerate the vehicle 10 and/or provide additional retarding torque. In particular, the retarding system 28 may include an engine retarder 30 and a fan 48.

The engine retarder 30 may embody any device that selectively increases the natural resistance of engine 12 to motion and/or provides additional retarding torque to the engine 12. For example, engine retarder 30 may embody an engine brake or an exhaust brake. An engine brake may comprise, for example, an engine compression brake or other like device. Such an engine brake may function to open the exhaust valves (not shown) of engine 12 near the top dead center (TDC) position of a piston's compression stroke. By opening the exhaust valves near top dead center of the compression stroke, highly-compressed air may be vented to the atmosphere, thereby removing stored energy from the associated pistons of the engine 12. On the ensuing downward power stroke, essentially no energy is returned to the piston (and to the traction device 18), resulting in a deceleration of the vehicle 10. In contrast, an exhaust brake may include a butterfly-type valve disposed within an exhaust manifold of the engine 12 to restrict the exiting flow of exhaust gases. The restricted flow of exhaust gases may cause a backup of pressure within the engine 12 that increases the work that the pistons of the engine 12 must perform during the compression and exhaust strokes of the engine 12, resulting in a deceleration of the vehicle 10 and/or an increase in retarding torque. It is contemplated that the engine retarder 30 may alternatively be located immediately upstream of the torque converter 14, such as between the engine 12 and the torque converter 14, to directly remove power from the input of the transmission 16. The removal of such power from the input of a transmission is known as "transmission braking." It is further contemplated that the engine retarder 30 may be hydraulically operated, mechanically operated, electrically operated, pneumatically operated, or operated in any other suitable manner. For example, the engine retarder 30 may have an activated state and a deactivated state, and the engine retarder may be configured to provide additional retarding torque to the engine 12 and thereby reduce the speed of the engine 12 in the activated state. The engine retarder 30 may, thus, assist in reducing a speed of the vehicle 10 in the activated state. As will be discussed below, the engine retarder 30 may also have an enabled state and a disabled state, and an operator of the vehicle 10 may manually transition the engine retarder 30 between the enabled and disabled states.

The fan 48 may be operably connected to and/or otherwise associated with the engine 12. For example, the fan 48 may be a component of a cooling circuit (not shown) associated with the engine 12. Such a cooling circuit may further include, for example, one or more motors, pumps, heat exchangers, hydraulic fluid coolers, air conditioners, fuel coolers, and/or other like devices. In such exemplary embodiments, the fan 48 may be disposed proximate an air-to-air or liquid-to-air heat exchanger (not shown) and configured to produce a flow of air directed through channels of the heat exchanger for heat transfer with coolant or combustion air therein. The fan 48 may include a plurality of blades connected to a motor 58, and the fan 48 may be driven by the motor 58 at a speed corresponding to a desired flow rate of air and/or a desired engine coolant temperature. In an exemplary embodiment, the fan 48 may have an activated state in which the fan 48 is driven by the motor 58, and a deactivated state in which the motor 58 is either disengaged from the fan 48 or disabled such that the fan 48 does not rotate. While in the activated state, the fan 48 may be configured to provide additional retarding torque to the engine 12, and thereby reduce the speed of the engine 12. The fan 48 may, thus, assist in reducing a speed of the vehicle 10 in the activated state.

The motor 58 may be connected to one or more hydraulic pumps (not shown) driven by the engine 12. For example, the motor 58 may be a fixed or variable displacement, rotary or piston-type hydraulic motor movable by an imbalance of pressure acting on a driven element thereof. Such a driven element may comprise, for example an impeller or a piston. Fluid pressurized by the one or more hydraulic pumps may be directed into the motor 58 and drained from the motor 58 via a hydraulic fluid circuit (not shown) associated with the engine 12. The direction of pressurized fluid to one side of the driven element and the draining of fluid from an opposing side of the driven element may create a pressure differential across the driven element that causes the driven element to move or rotate. The direction and rate of fluid flow through motor 58 may determine the rotational direction and speed of the motor 58, and thus, of the fan 20. As the one or more hydraulic pumps supplying fluid to the motor 58 are driven by the engine 12, and as the fan 48 is driven by the motor 58, each of these components may represent a parasitic load on the engine 12. In exemplary embodiments, the activation of one or more of these components may assist in providing additional retarding torque to the engine 12, and may thereby reduce the speed of the engine 12. The activation of one or more of the above components may, thus, assist in reducing the speed of the vehicle 10.

The controller 32 may embody a single microprocessor or multiple microprocessors that include a means for controlling an operation of the retarding system 28. Numerous commercially available microprocessors can be configured to perform the functions of the controller 32. It should be appreciated that the controller 32 could readily embody a general vehicle microprocessor capable of controlling numerous vehicle functions. Various other known circuits may be associated with the controller 32, including power supply circuitry, signal-conditioning circuitry, solenoid driver circuitry, communication circuitry, and other appropriate circuitry.

The controller 32 may be in communication with various components of the vehicle 10. In particular, the controller 32 may be in communication with an engine speed sensor 34 via a communication line 36 to receive an indication of a rotational speed of the engine 12, with the transmission 16 via a communication line 38 to affect downshifting and/or upshifting of the transmission 16, with a vehicle travel speed sensor 40 via a communication line 42 to receive an indication of a travel speed of the vehicle 10, with the brake mechanism 20 via a communication line 44 to determine whether the brake mechanism 20 is active or inactive, and with the engine retarder 30 via a communication line 45. The controller 32 may also be in communication with the fan 48, the motor 58, and or the hydraulic pump associated with the motor 58 via one or more communication lines (not shown). In addition, the controller 32 may be in communication with the throttle pedal 46a, the brake pedal 46b, and the engine retarder switch 46c via the communication lines 50, 52, 54, respectively. The controller 32 may also be in communication with any of the other operator interface devices 46, such as a gear selector configured to enable an operator to select a desired and/or maximum gear ratio of the transmission 16, via one or more additional communication lines (not shown). In exemplary embodiments, the controller 32 may be configured to receive signals from the throttle pedal 46a, the brake pedal 46b, and the engine retarder switch 46c, and/or the sensors associated with the operator interface devices 46. For example, the controller 32 may be configured to receive signals indicative of, among other things, a desired deceleration of the vehicle 10, an enablement of the engine retarder 30, a selection of a desired minimum gear ratio of the transmission 16 by the operator, and a deselection of the desired minimum gear ratio by the operator.

The engine and vehicle travel speed sensors 34, 40 may both embody magnetic pickup-type sensors. In particular, the engine speed sensor 34 may be associated with a flywheel (not shown) or other like component of the engine 12, and configured to sense a rotational speed and produce a corresponding speed signal. Similarly, vehicle travel speed sensor 40 may be associated with shaft 23 and configured to sense a travel speed and produce a corresponding speed signal.

The controller 32 may include one or more maps stored within an internal memory of the controller 32, and may reference these maps to determine the effect of transmission gear ratio, fan activation, and/or engine retarder activation on the speed of engine 12. Each of these maps may include a collection of data in the form of tables, graphs, and/or equations. In one exemplary embodiment, vehicle travel speed and the current gear ratio of transmission 16 may form the coordinate axis of a two-dimensional graph or table for determining the resulting speed of the engine 12 after activation of the engine retarder 30. In another exemplary embodiment, vehicle travel speed and the current gear ratio of transmission 16 may form the coordinate axis of a two-dimensional graph or table for determining the resulting speed of the engine 12 after activation of the fan 48 while the engine retarder 30 is activated. In a further exemplary embodiment, vehicle travel speed, the current gear ratio of transmission 16, and the current rotational speed of engine 12 may form the coordinate axis of a three-dimensional table or graph. Such a three-dimensional table may be useful in, for example, determining whether to activate the fan 48 after the engine retarder 30 has been activated. It is contemplated that an operator of vehicle 10 may be allowed to directly modify these maps and/or to select specific maps from available relationship maps stored in the memory of controller 32 to affect activation of the engine retarder 30 and/or the fan 48. It is further contemplated that the maps may alternatively be manually or automatically selectable based on modes of vehicle operation.

INDUSTRIAL APPLICABILITY

The disclosed retarding system 28 may be applicable to any vehicle where braking is desired. The retarding system 28 may activate the engine retarder 30 to increase the natural resistance of the engine 12 and/or provide additional retarding torque to the engine 12. Such activation may assist in reducing the speed of the vehicle 10. In addition, the controller 32 may activate and/or maintain activation of various parasitic loads on the engine 12 and/or vehicle 10 if the current level of braking and/or retarding torque provided by the engine retarder 30 is insufficient. Parasitic loading of the engine 12 and/or vehicle 10 may include, among other things, the activation and/or operation of the fan 48, the motor 58, a hydraulic pump associated with the motor 58, an air conditioning pump, an electric generator, and other such devices that draw power from the engine 12 and/or the vehicle 10. The retarding system 28 may also prohibit activation of the fan 48 unless the engine retarder 30 is activated and a minimum gear ratio selected by the operator is greater than or equal to a threshold gear ratio.

Figure 3:
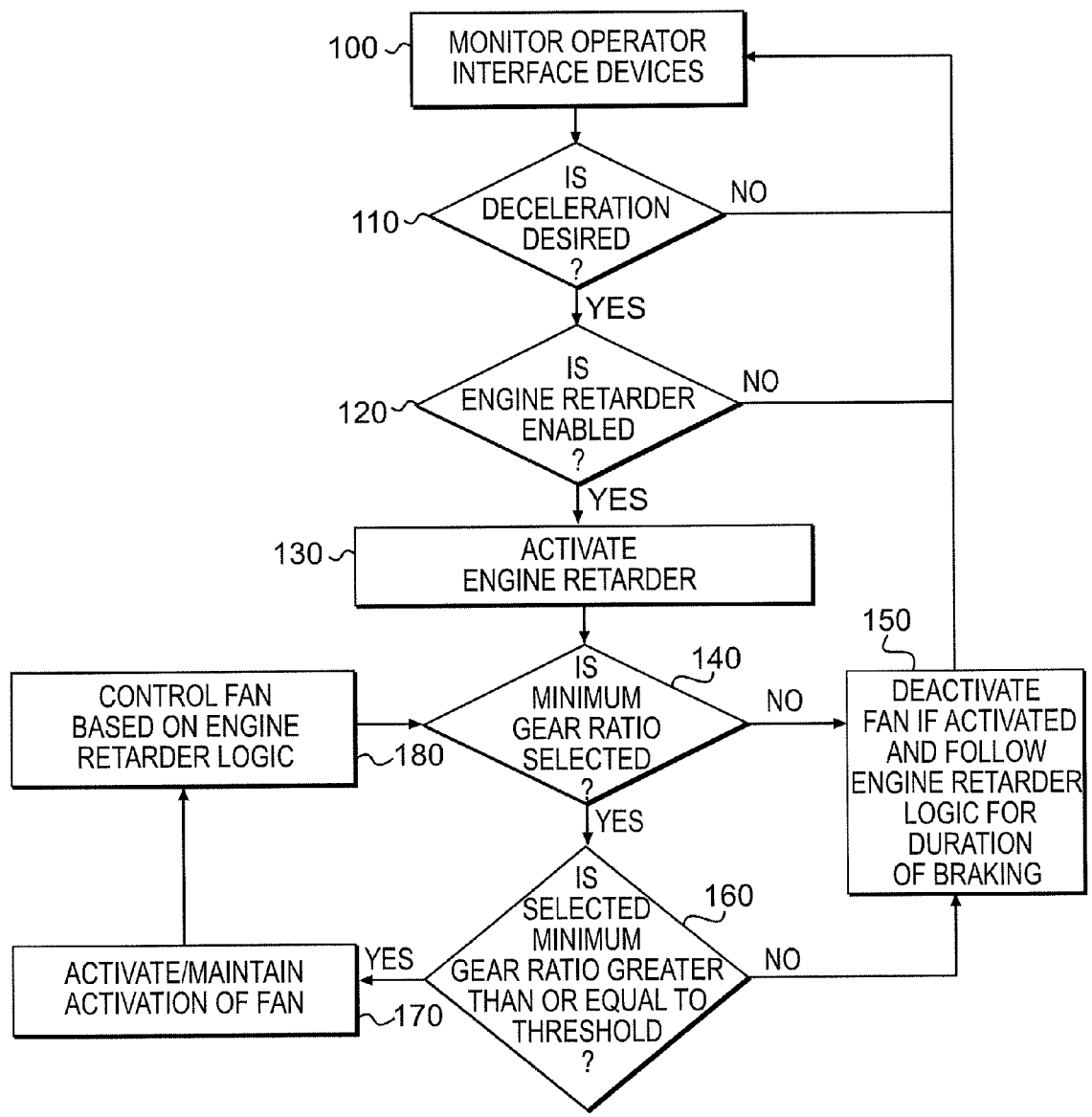
FIG. 3 is a flow chart depicting an exemplary method of braking the vehicle of FIG. 1.

As shown in FIG. 3, in an exemplary method of braking the vehicle 10 the controller 32 may monitor one or more of the operator interface devices 46 described above during operation of the vehicle 10 (Step 100). For example, the controller 32 may continuously receive signals from the operator interface devices 46 indicative of device status (e.g., enabled/disabled, activated/deactivated, position, and/or movement). Such signals may be requested by the controller 32 or may be automatically sent by the operator interface devices 46. Based on these signals, the controller 32 may determine whether or not deceleration of the vehicle 10 is desired (Step 110).

As described above, signals generated by the throttle pedal 46a, brake pedal 46b, and/or the sensors associated with these pedals 46a, 46b may provide an indication of operator-desired acceleration or deceleration. For example, if the throttle pedal 46a is situated in a depressed position and is then released, it can be assumed that a deceleration of the vehicle 10 is desired. Additionally, if the throttle pedal 46a is in a first depressed position and is then released and/or otherwise moved to a second less depressed position, it can be assumed that a deceleration of the vehicle 10 is desired. The rate of releasing may provide an indication of the magnitude of the desired deceleration. In contrast, if throttle pedal 46a is depressed to a greater extent, it can be assumed that acceleration of the vehicle 10 is desired.

Similarly, if the brake pedal 46b is depressed, it can be assumed that deceleration of the vehicle 10 is desired. The rate of depressing may provide an indication of the magnitude of the desired deceleration. In contrast, if brake pedal 46b is released from a depressed position, it can be assumed that the amount of deceleration is sufficient or that deceleration is no longer desired. Desired deceleration/speed reduction may also be indicated by continued actuation of the brake pedal 46b for an extended predetermined period of time. Alternatively, the current deceleration rate of the vehicle 10 and/or the current speed of the vehicle 10 may be directly monitored via the engine speed sensor 34 or the vehicle travel speed sensor 40. These values may be compared to respective deceleration rate threshold and vehicle speed threshold values stored within the memory of the controller 32, and the determination to decelerate/reduce vehicle speed may be made by the controller 32 if these current values are below such thresholds. If deceleration is not desired, control may return to Step 100.

If deceleration is desired, the controller 32 may then determine whether or not the engine retarder 30 is enabled (Step 120). The engine retarder 30 may provide signals to the controller 32 indicative of this status information automatically or only when prompted by the controller 32. Alternatively, the controller 32 may determine the status of the engine retarder 30 based on signals received from the engine retarder switch 46c indicative of the position and/or status of the engine retarder switch 46c. An operator may choose to enable the engine retarder 30 by placing the engine retarder switch 46c in an "enabled" position. Alternatively, an operator may choose to disable the engine retarder 30 by placing the engine retarder switch 46c in a "disabled" position. When the engine retarder 30 is enabled, it may be capable of and/or otherwise configured to be activated in response to a control command, and when the engine retarder 30 is disabled, it may be unresponsive to such commands. If the engine retarder 30 is not enabled, control may return to Step 100.

If the engine retarder 30 is enabled, the controller 32 may transition the engine retarder 30 from a deactivated state to an activated state in response to determining that vehicle deceleration is desired. Activation of the engine retarder 30 may be directly tied to the manipulation and/or activation of one or more of the operator interface devices 46. For example, if deceleration is desired (Step 100) and the engine retarder 30 is enabled (Step 120), the controller 32 may activate the engine retarder 30 at Step 130 once the throttle pedal 46a is released, once the throttle pedal 46a is moved from a first depressed position to a second less depressed position, and/or once the brake pedal 46b is depressed. Activation of the engine retarder 30 may comprise at least one of activation of an exhaust brake and activation of an engine brake. It is understood that activation of the engine retarder 30 may increase the natural resistance of the engine 12 and may provide a retarding torque the engine 12. The retarding torque provided by the engine retarder 30 and/or the increased natural resistance may assist in reducing the speed of the vehicle 10 and/or the engine 12.

In additional exemplary embodiments, the controller 32 may determine if engagement of the brake mechanism 20 alone will result in a sufficient reduction in vehicle speed under the current operating conditions, such that activation of the engine retarder 30 may be prohibited/overridden. Such a determination may be made before Step 130. For example, when the vehicle 10 is traversing a relatively flat surface or a relatively moderate declining grade, engagement of the brake mechanism 20 alone may be sufficient to reduce the speed of the vehicle speed 10 to acceptable levels. Such a reduction in vehicle speed may coincide with a reduction in engine rotational speed and/or transmission gear ratio. However, if the vehicle 10 is traversing a relatively steep declining grade such as, for example, a hill or other like terrain, the rate of deceleration of the vehicle 10 caused by the brake mechanism 20 alone may not be sufficient. In addition, utilizing only the brake mechanism 20 in such operating conditions can cause overheating of brake mechanism components and premature failure. The controller 32 may determine if the current rate of deceleration is sufficient by monitoring the actuation of throttle and brake pedals 46a and 46b or, alternatively, by comparing the rate of deceleration to a predetermined deceleration threshold value.

Thus, if the engagement of the brake mechanism 20 alone will reduce the rotational speed of the engine 12 and/or the travel speed of the vehicle 10 below a respective threshold corresponding to such operating characteristics, control may return to Step 100 without activation of the engine retarder 30. Otherwise, if the rotational speed of the engine 12 and/or the travel speed of the vehicle 10 is less than a respective threshold corresponding to such operating characteristics, the controller 32 may activate the engine retarder 30 as described above with respect to Step 130.

Upon activation of the engine retarder 30, the controller 32 may determine whether a minimum gear ratio of the transmission 16 has been selected by the operator (Step 140). The operator may select a minimum gear ratio using, for example, the gear selector described above and/or other like operator interface devices 46. In an exemplary embodiment, the controller 32 may receive a signal from the gear selector indicative of a selection of the minimum gear ratio by the operator, and such a signal may be sent by the gear selector automatically upon manipulation by the operator. Such a minimum gear ratio may be, for example, the lowest gear ratio of the transmission 16 desired by the operator for a given operating condition of the vehicle 10. For example, prior to descending a relatively steep declining grade, the operator may manipulate the gear selector to select a relatively high (slow) gear of the transmission 16, thereby limiting operation of the transmission 16 to the selected maximum gear/minimum gear ratio. Selection of the minimum gear ratio may prohibit automatic downshifting of the transmission 16 to a relatively lower (faster) gear while descending the relatively steep declining grade, and may thereby limit the rotational speed of the engine 12 during such vehicle operating conditions. It is understood that the "gear ratio" defined herein may be defined as engine speed divided by transmission speed. The minimum allowable gear ratio selected by the operator may correspond to a maximum allowable gear of the transmission 16.

If no minimum gear ratio has been selected by the operator, the transmission 16 may be in, for example, a normal "drive" condition. In such circumstances, control of the activated engine retarder 30 may be governed by pre-programmed and/or otherwise predetermined engine retarder control logic for the duration of the vehicle braking (Step 150). For example, a variety of control algorithms may be stored in the controller 32 for operation and eventual deactivation of the engine retarder 30 under various vehicle operating conditions. Control of the engine retarder 30 may follow such algorithms at Step 150 if no minimum gear ratio has been selected. It is understood that the fan 48 may remain disabled and/or otherwise deactivated while the engine retarder 30 is in the activated state if no minimum gear ratio has been selected by the operator.

If the operator has selected a minimum gear ratio, the controller 32 may compare the selected minimum gear ratio to a threshold gear ratio at Step 160. If the selected minimum gear ratio is less than the threshold gear ratio, control may return to Step 150 without activation of the fan 48 and/or other parasitic loads. Alternatively, if the selected minimum gear ratio is greater than or equal to the threshold gear ratio, and if the engine retarder 30 is activated, the controller 32 may sequentially activate the fan 48 and/or one or more additional parasitic loads (Step 170). Sequentially activating such parasitic loads may further increase the natural resistance of the engine 12 and may provide additional retarding torque to the engine 12. Such additional retarding torque and/or natural resistance may further reduce the speed of the vehicle 10 and/or the engine 12.

Upon activation of, for example, the fan 48, the fan 48 may be controlled based on the predetermined engine retarder control logic described above (Step 180). For example, based on such control logic, both the engine retarder 30 and the fan 48 may remain active for the duration of vehicle braking, or until these components are deactivated by the engine retarder control logic. In exemplary embodiments, the engine retarder control logic may deactivate the engine retarder 30 once a desired engine speed and/or vehicle speed has been reached. In accordance with such control logic, the fan 48 may be deactivated in response to deactivation of the engine retarder 30.

Additionally, with control of the activated fan 48 being governed by the predetermined engine retarder control logic at Step 180, the controller 32 may continue to monitor whether a minimum gear ratio has been selected and/or maintained by the operator (Step 140). For example, if the operator deselects the minimum gear ratio after activation of the fan 48 at Step 170, the controller 32 may receive a signal from the gear selector indicative of such a deselection. The controller 32 may deactivate the fan 48, while the engine retarder 30 remains active, in response to receiving such a signal (Step 150). In such an exemplary embodiment, the engine retarder 30 may remain active after deactivation of the fan 48, for the duration of vehicle braking, in accordance with the predetermined engine retarder control logic (Step 150). In still further exemplary embodiment, Step 140 and/or step 180 may be omitted. In such exemplary embodiments, control may return to Step 160 or Step 150 after activation of the fan 48 at Step 170.

Several advantages of retarding system 28 may be realized over the prior art. For example, because the fan 48 is not automatically activated when the engine retarder 30 is activated, the retarding system 28 may operate more efficiently. In particular, the retarding system 28 may avoid utilization of fuel and other resources required for fan operation when additional retarding torque through fan activation is not necessary. Accordingly, the retarding system 28 enables tailoring the level of engine retarding and vehicle braking to the needs of the vehicle 10 and its operator.

It will be apparent to those skilled in the art that various modifications and variations can be made to the retarding system of the present disclosure. Other embodiments of the retarding system will be apparent to those skilled in the art from consideration of the specification and practice of the retarding system disclosed herein. It is intended that the specification and examples be considered as exemplary only, with a true scope of the disclosure being indicated by the following claims and their equivalents.

What is claimed is:

1. A vehicle, comprising:
an engine;
a transmission associated with the engine;
an engine retarder having a deactivated state and an activated state, the engine retarder configured to reduce a speed of the engine in the activated state; and
a fan associated with the engine, the fan configured to be activated in response to a selection of a transmission gear ratio less than or equal to a threshold gear ratio while the engine retarder is in the activated state, wherein the fan assists in further reducing the speed of the engine while activated.

2. The vehicle of claim 1, wherein the fan is configured to be deactivated while the engine retarder is in the activated state if no transmission gear ratio has been selected.

3. The vehicle of claim 1, wherein the engine retarder is configured to increase a natural resistance of the engine in the activated state.

4. The vehicle of claim 1, further comprising a controller configured to transition the engine retarder from the deactivated state to the activated state in response to a determination that deceleration of the vehicle is desired.

5. The vehicle of claim 4, wherein the controller is configured to sequentially activate the fan if the engine retarder is activated and if the selected gear ratio is greater than or equal to the threshold gear ratio.

6. The vehicle of claim 4, further comprising a throttle pedal configured to increase the speed of the engine, wherein the determination is based on a release of the throttle pedal from a depressed position.

7. The vehicle of claim 4, further including an operator interface device configured to enable the engine retarder, wherein the determination is based on the operator interface device being in an enabled position.

8. The vehicle of claim 1, further including a hydraulic pump driven by the engine and a motor fluidly connected to the hydraulic pump, wherein the fan is driven by the motor.

9. The vehicle of claim 1, wherein the engine retarder comprises one of an exhaust brake and an engine brake.

10. A method of braking a vehicle, comprising:
activating an engine retarder connected to an engine of the vehicle, wherein activation of the engine retarder provides a retarding torque to the engine; and
activating a fan associated with the engine, while the engine retarder is activated, in response to a selection of a transmission gear ratio greater than or equal to a threshold gear ratio, wherein activation of the fan provides additional retarding torque to the engine.

11. The method of claim 10, further comprising deactivating the engine retarder, and deactivating the fan in response to deactivating the engine retarder.

12. The method of claim 10, further comprising deactivating the fan and keeping the engine retarder activated in response to deselection of the transmission gear ratio.

13. The method of claim 10, further including determining that deceleration of the vehicle is desired and activating the engine retarder in response to the determination.

14. The method of claim 10, further including traversing a declining grade with the vehicle while the transmission gear ratio is selected.

15. The method of claim 10, further including sensing a position of a throttle pedal of the vehicle, wherein the engine retarder is activated in response to the sensing.

16. A method of braking a vehicle, comprising:
receiving a first signal, the first signal indicative of a desired deceleration of the vehicle;
receiving a second signal, the second signal indicative of an enablement of an engine retarder connected to an engine of the vehicle;
activating the engine retarder in response to receiving the first and second signals, wherein activation of the engine retarder provides a retarding torque to the engine;
receiving a third signal, the third signal indicative of a selection of a gear ratio of a transmission associated with the engine, wherein the selected gear ratio is greater than or equal to a threshold gear ratio; and
activating a fan associated with the engine, while the engine retarder is activated, in response to receiving the third signal to provide additional retarding torque to the engine.

17. The method of claim 16, wherein the first signal is indicative of a release of a throttle pedal of the vehicle from a depressed position.

18. The method of claim 16, further comprising deactivating the engine retarder, and deactivating the fan in response to deactivating the engine retarder.

19. The method of claim 16, further comprising receiving a fourth signal indicative of deselection of the selected gear ratio, and deactivating the fan, while the engine retarder is activated, in response to receiving the fourth signal.

20. The method of claim 16, wherein the selected gear ratio comprises a minimum desired gear ratio selected by an operator of the vehicle.

* * * * *